United States Patent
Shao et al.

(10) Patent No.: US 12,475,519 B2
(45) Date of Patent: Nov. 18, 2025

(54) METHODS AND SYSTEMS OF ENVIRONMENTAL MONITORING BASED ON INTELLIGENT GAS REGULATORY INTERNET OF THINGS (IoTs)

(71) Applicant: CHENGDU QINCHUAN IOT TECHNOLOGY CO., LTD., Sichuan (CN)

(72) Inventors: Zehua Shao, Chengdu (CN); Yaqiang Quan, Chengdu (CN); Junyan Zhou, Chengdu (CN); Feng Wang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/057,953

(22) Filed: Feb. 19, 2025

(65) Prior Publication Data

US 2025/0232390 A1  Jul. 17, 2025

(30) Foreign Application Priority Data

Oct. 29, 2024 (CN) .......................... 202411519763.7

(51) Int. Cl.
*G06Q 50/06* (2024.01)
*G06Q 10/20* (2023.01)
*G06Q 30/018* (2023.01)

(52) U.S. Cl.
CPC .............. *G06Q 50/06* (2013.01); *G06Q 10/20* (2013.01); *G06Q 30/018* (2013.01)

(58) Field of Classification Search
CPC ......... G06Q 10/20; G06Q 50/06; G06Q 50/26
See application file for complete search history.

(56) References Cited

U.S. PATENT DOCUMENTS 12,008,581 B1 *  6/2024  Payne ................... G06Q 30/018
2013/0282624 A1 * 10/2013  Schackmuth ........ G01R 19/165
                                                     340/657

(Continued)

FOREIGN PATENT DOCUMENTS

CN          106302739 A       1/2017
CN          107846446 A   *   3/2018   ............. H04L 67/12

(Continued)

OTHER PUBLICATIONS

Ma, Q., Tian, G., Zeng, Y., Li, R., Song, H., Wang, Z., Gao, B., & Zeng, K. (2021). Pipeline In-Line Inspection Method, Instrumentation and Data Management. Sensors, 21(11), 3862 (Year: 2021).*

(Continued)

*Primary Examiner* — Andrew Chase Lakhani
(74) *Attorney, Agent, or Firm* — METIS IP LLC

(57) ABSTRACT

Embodiments of the present disclosure provide a method and system for environmental monitoring based on an intelligent gas regulatory IOTs, the method comprising: determining a target enterprise user and a corresponding target monitoring point location and a target monitoring parameter based on acquired gas regulatory data; determining a government environmental sampling parameter based on government environmental monitoring information, the target monitoring point location, and the target monitoring parameter, and obtaining surrounding environmental data based on the government environmental sampling parameter; controlling an environmental monitoring device to collect target monitoring data; determining a maintenance parameter based on the target monitoring data and the surrounding environmental data; generating a maintenance instruction based on an device operating state and the maintenance parameter; and adjusting the collection frequency of obtaining the gas regulatory data based on an execution result of the maintenance instruction and adjusting (Continued)

a storage space allocation parameter for the gas regulatory data of a different enterprise user, a data cleaning parameter; based on the collection frequency and the storage space allocation parameter, adjust a computing resource allocation parameter.

17 Claims, 5 Drawing Sheets

(56) References Cited

U.S. PATENT DOCUMENTS

| | | | | |
|---|---|---|---|---|
| 2013/0321131 A1* | 12/2013 | Tucker | ............... | G06K 7/10366 340/10.1 |
| 2022/0163365 A1* | 5/2022 | Shao | ....................... | G16Y 40/10 |
| 2024/0310006 A1 | 9/2024 | Shao et al. | | |

FOREIGN PATENT DOCUMENTS

| | | | | |
|---|---|---|---|---|
| CN | 110134094 | B | | 1/2021 |
| CN | 112418571 | A | | 2/2021 |
| CN | 113888132 | A | | 1/2022 |
| CN | 115237972 | A | | 10/2022 |
| CN | 115310813 | A | | 11/2022 |
| CN | 117969758 | A | | 5/2024 |
| CN | 118442548 | A | | 8/2024 |
| CN | 118569814 | A | | 8/2024 |
| CN | 119047709 | A * | 11/2024 | ............. G06Q 50/06 |
| IN | 202011036257 | A | | 9/2020 |
| KR | 102414441 | B1 | | 6/2022 |
| WO | 2020010701 | A1 | | 1/2020 |

OTHER PUBLICATIONS

First Office Action in Chinese Application No. 202411519763.7 mailed on Dec. 4, 2024, 13 pages.
Decision to Grant a Patent in Chinese Application No. 202411519763.7 mailed on Jan. 3, 2025, 4 pages.
Xu, Bo et al., Discussion on supervision points of ecological environment protection for natural gas exploitation company, Chemical Industry and Engineering Progress, 40(S2): 456-460, 2021.

* cited by examiner

300

For each of at least one enterprise user, determining, based on gas regulatory data corresponding to an enterprise user, a matching degree between gas usage data and exhaust gas emission with exhaust gas treatment device operation data ⟵ 310

↓

Determining at least one target enterprise user based on the matching degree ⟵ 320

↓

Determining at least one target monitoring point location and a target monitoring parameter corresponding to the at least one target enterprise user based on gas regulatory data of the at least one target enterprise user ⟵ 330

Determining a device operating state based on target monitoring data, surrounding environmental data, and an enterprise gas layout graph of at least one target enterprise user — 510

Determining a device maintenance parameter based on the device operating state — 520

FIG. 5

METHODS AND SYSTEMS OF ENVIRONMENTAL MONITORING BASED ON INTELLIGENT GAS REGULATORY INTERNET OF THINGS (IoTs)

CROSS-REFERENCE TO RELATED APPLICATIONS

This application claims priority to Chinese patent application No. 202411519763.7, filed on Oct. 29, 2024, the entire contents of which are incorporated herein by reference.

TECHNICAL FIELD

The present disclosure relates to the field of gas monitoring, and in particular to a method and system of environmental monitoring based on intelligent gas regulatory Internet of Things.

BACKGROUND

Gas or natural gas is generally filtered and purified at a gas field station after production and extraction. However, impurities such as nitrogen compounds and sulfides may still remain after filtration. These impurities may cause environmental pollution problems under inappropriate use environments/conditions. If gas-related enterprises in the use of natural gas and/or gas engaged in production and processing activities lack sufficient attention to environmental protection facilities, problems such as outdated and aging environmental protection facilities, improper management and maintenance may be happened, leading to environmental pollution, which may not only make the enterprise face environmental penalties, but also increase the difficulty of the government regulatory platform and reduce the effectiveness of supervision.

Accordingly, it is desirable to provide a method and system of environmental monitoring based on intelligent gas regulatory Internet of Things, which can effectively monitor the discharge of gas-related enterprises and improve the effectiveness of environmental protection facilities.

SUMMARY

One or more embodiments of the present disclosure provide a method for environmental monitoring based on intelligent gas regulatory Internet of Things (IOTs), the method being executed by a gas company management platform of an intelligent gas IOTs system, the method comprising: obtaining gas regulatory data of at least one enterprise user based on a gas device object platform, and storing the gas regulatory data categorized by the at least one enterprise user in an environmental protection data center; determining, based on the gas regulatory data, at least one target enterprise user and at least one target monitoring point location and target monitoring parameter corresponding to the at least one target enterprise user; sending the at least one target monitoring point location and the target monitoring parameter to a government gas management platform, determining, through the government gas management platform, a government environmental sampling parameter based on government environmental monitoring information, the at least one target monitoring point location, and the target monitoring parameter, sampling based on the government environmental sampling parameter to obtain surrounding environmental data, and sending the surrounding environmental data to the gas company management platform; controlling an environmental monitoring device to monitor the at least one target monitoring point location according to the target monitoring parameter to determine target monitoring data; determining, based on the target monitoring data and the surrounding environmental data, a device maintenance parameter for the at least one target enterprise user, wherein the device maintenance parameter includes a maintenance process and a maintenance time; generating, based on a device operating state and the maintenance parameter, at least one maintenance instruction, and sending, through the gas user platform, the at least one maintenance instruction to the corresponding target enterprise user respectively; in response to receiving confirmation feedback from the at least one target enterprise user of the maintenance instruction, controlling a maintenance device to execute the maintenance instruction based on a gas company sensing network platform; obtaining an execution result of the at least one maintenance instruction, adjusting, based on the execution result, a collection frequency of the gas device object platform for obtaining the gas regulatory data, and adjusting at least one of a storage space allocation parameter and a data cleaning parameter of the environmental protection data center for the gas regulatory data of each of the at least one enterprise user; and adjusting, based on the collection frequency and the storage space allocation parameter, a computing resource allocation parameter of the gas company management platform for supervision of each of the at least one enterprise user.

One or more embodiments of the present disclosure provide a system of environmental monitoring based on intelligent gas regulatory Internet of Things (IOTs), wherein the system comprises a storage device and a processor, the storage device storing computer instructions; the processor being connected to the storage device; and the processor causes the system to perform: obtaining gas regulatory data of at least one enterprise user based on a gas device object platform, and storing the gas regulatory data categorized by the at least one enterprise user in an environmental protection data center; determining, based on the gas regulatory data, at least one target enterprise user and at least one target monitoring point location and target monitoring parameter corresponding to the at least one target enterprise user; sending the at least one target monitoring point location and the target monitoring parameter to a government gas management platform, determining, through the government gas management platform, a government environmental sampling parameter based on government environmental monitoring information, the at least one target monitoring point location, and the target monitoring parameter, sampling based on the government environmental sampling parameter to obtain surrounding environmental data, and sending the surrounding environmental data to the gas company management platform; controlling an environmental monitoring device to monitor the at least one target monitoring point location according to the target monitoring parameter to determine target monitoring data; determining, based on the target monitoring data and the surrounding environmental data, a device maintenance parameter for the at least one target enterprise user, wherein the device maintenance parameter includes a maintenance process and a maintenance time; generating, based on an device operating state and the maintenance parameter, at least one maintenance instruction, and sending, through the gas user platform, the at least one maintenance instruction to the corresponding target enterprise user respectively; in response to receiving confirmation feedback from the at least one target enterprise user of the maintenance instruction, controlling a maintenance device to execute the maintenance instruction based on a gas company sensing network platform; obtaining an execution result of the at least one maintenance instruction, adjusting, based on the execution result, a collection frequency of the gas device object platform for obtaining the gas regulatory data, and adjusting at least one of a storage space allocation parameter and a data cleaning parameter of the environmental protection data center for the gas regulatory data of each of the at least one enterprise user; and adjusting, based on the collection frequency and the storage space allocation parameter, a computing resource allocation parameter of the gas company management platform for supervision of each of the at least one enterprise user.

One or more embodiments of the present disclosure provide a computer-readable storage medium, wherein the storage medium stores computer instructions to realize a method for environmental monitoring based on intelligent gas regulatory IoTs when the computer instructions are executed by a processor.

Some embodiments of the present disclosure include at least following beneficial effect: by analyzing the gas regulatory data of different enterprise users, dynamically assessing the impact and risk of the user in terms of environmental protection, and performing maintenance treatment in the presence of risk, the effectiveness of the environmental protection facilities can be improved to satisfy the need to effectively reduce environmental pollution.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 3 is a flowchart illustrating a process of determining a target enterprise user according to some embodiments of the present disclosure;

FIG. 5 is a flowchart illustrating a process of determining a device maintenance parameter according to some embodiments of the present disclosure.

DETAILED DESCRIPTION

Figure 1:
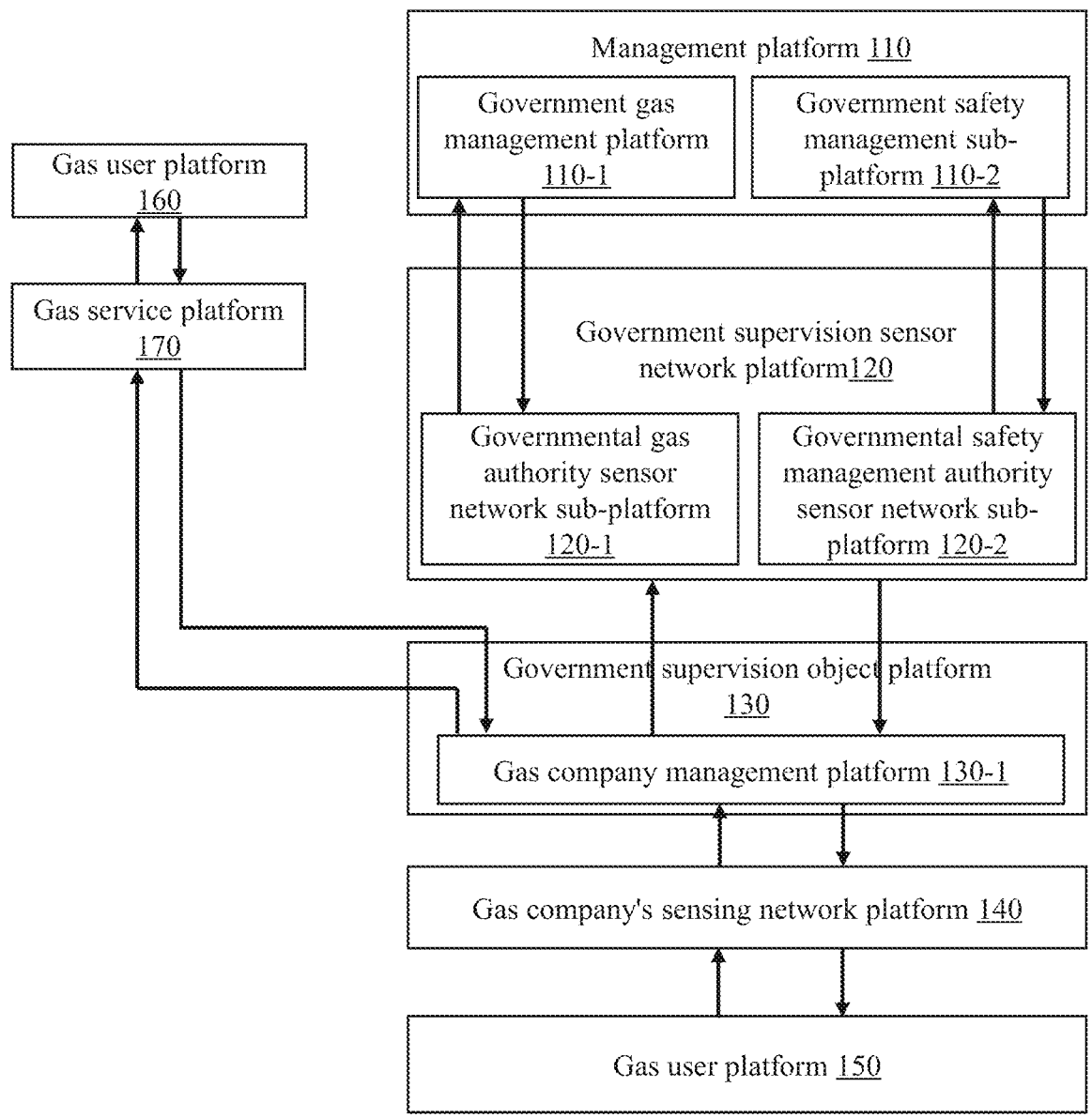
FIG. 1 is a schematic diagram illustrating an intelligent gas Internet of Things (IoTs) system according to some embodiments of the present disclosure.

In order to more clearly illustrate the technical solutions of the embodiments of the present disclosure, the accompanying drawings required to be used in the description of the embodiments will be briefly described below. Obviously, the accompanying drawings in the following description are only some examples or embodiments of the present disclosure, and it is possible for a person of ordinary skill in the art to apply the present disclosure to other similar scenarios based on these drawings without creative labor. The present disclosure may be applied to other similar scenarios based on these drawings without creative labor. Unless obviously obtained from the context or the context illustrates otherwise, the same numeral in the drawings refers to the same structure or operation.

It will be understood that the term "system," "engine," "unit," "module," and/or "block" used herein are one method to distinguish different components, elements, parts, section or assembly of different level in ascending order. However, the terms may be displaced by another expression if they achieve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

Flowcharts are used in the present disclosure to illustrate the operation performed by the system according to the embodiment of the present disclosure. It should be understood that the preceding or subsequent operations are not necessarily performed accurately in sequence. Instead, the steps may be processed in reverse order or simultaneously. At the same time, other operations may add to these procedures, or remove one or more operations from these procedures.

FIG. 1 is a schematic diagram illustrating an intelligent gas Internet of Things (IoTs) system according to some embodiments of the present disclosure. It should be noted that the following embodiments are used only for the purpose of explaining the present disclosure, which do not constitute a limitation of the present disclosure.

As shown in FIG. 1, in some embodiments, the intelligent gas IOTs system 100 may include a government supervision and management platform 110, a government supervision sensor network platform 120, a government supervision object platform 130, a gas company sensing network platform 140, a gas device object platform 150, a gas user platform 160, and a gas service platform 170.

In some embodiments, information and/or data may be exchanged between one or more platforms in the intelligent gas IOTs system 100 via a network. In some embodiments, the network may be any one or more of a wired network or a wireless network.

The government supervision and management platform 110 refers to a management platform for the government to perform safety supervision and management.

In some embodiments, the government supervision and management platform 110 may include a government gas management platform 110-1 and a government safety management sub-platform 110-2. The government gas management platform 110-1 refers to a platform for the government configured to manage gas-related data, and the government safety management sub-platform 110-2 refers to a platform for the government configured to implement safety management of gas.

In some embodiments, the government gas management platform 110-1 is configured to receive a target monitoring point location and a target monitoring parameter. In some embodiments, the government gas management platform 110-1 is also configured to determine, through the government gas management platform, a government environmental sampling parameter based on the government environmental monitoring information, the at least one target monitoring point location, and the target monitoring parameter, sample based on the government environmental sampling parameter to obtain surrounding environmental data, and send the surrounding environmental data to the gas company management platform 130-1. More descriptions of the gas company management platform 130-1 may be found in the related description later in the present disclosure.

The government supervision sensor network platform 120 is a functional platform for management of sensor communications. The government supervision sensor network platform 120 may be an intermediate platform for realizing interaction between the government supervision and management platform 110 and the government supervision object platform 130. In some embodiments, the government supervision sensor network platform 120 may perform functions of sensing communications for sensing information and sensing communications for controlling information.

In some embodiments, the government supervision sensor network platform 120 may include a sensor network sub-platform 120-1 of a government gas regulatory department and a sensor network sub-platform 120-2 of a government security management department. The sensor network sub-platform 120-1 of the government gas regulatory department refers to an interface platform for realizing interaction between the government gas management platform 110-1 and the gas company management platform 130-1, and the sensor network sub-platform 120-2 of the government security management department refers to an interface platform for realizing interaction between the government safety management sub-platform 110-2 and the gas company management platform 130-1.

The government supervision object platform 130 refers to a platform used for safety supervision of gas-related objects. In some embodiments, the government supervision object platform 130 may perform information interaction with the government supervision sensor network platform 120, the government supervision sensor network platform 140, and the gas service platform 170.

In some embodiments, the government supervision object platform 130 may include a gas company management platform 130-1. The gas company management platform 130-1 refers to a comprehensive management platform for gas company information. In some embodiments, the gas company management platform 130-1 may interact with the gas service platform 170 with the government supervision sensor network platform 120. For example, the gas company management platform 130-1 may obtain a confirmation feedback from the enterprise user uploaded by the gas customer service platform 170.

In some embodiments, the gas company management platform 130-1 is configured to perform a method for environmental monitoring based on intelligent gas regulatory Internet of Things (IoTs) as described in any of the embodiments of the present disclosure, which may be seen in FIGS. 2-5.

The gas company sensing network platform 140 refers to a functional platform for the integrated management of sensor communications.

In some embodiments, the gas company sensing network platform 140 is interact with the gas device object platform 150 and the gas company management platform 130-1. For example, the gas company sensing network platform 140 may obtain the gas regulatory data via the gas device object platform 150 and transmit the gas regulatory data to the gas company management platform 130-1.

In some embodiments, in response to receiving confirmation feedback from the enterprise user of the maintenance instruction uploaded by the gas service platform 170, the gas company sensing network platform 140 may control the maintenance device to execute the maintenance instruction. The enterprise user may enter the confirmation feedback on the maintenance instructions in the gas user platform 160.

The gas device object platform 150 is a functional platform associated with the gas device for sensing information generation and controlling information execution.

In some embodiments, the gas device object platform 150 is configured to interact with a plurality of gas devices. The plurality of devices may include at least one of a gas device (e.g., a gas meter, etc.), a gas monitoring device (e.g., a gas pressure monitoring device, a temperature monitoring device, a flow rate monitoring device), an environmental protection facility (e.g., an exhaust gas treatment device, an environmental monitoring device), a maintenance device (e.g., an overhauling device, a cleaning device, etc.), or the like.

In some embodiments, the gas device object platform 150 may interact with the gas company sensing network platform 140. For example, the gas device object platform 150 may obtain data related to the gas device (e.g., gas regulatory data) and send the related data through the gas company sensing network platform 140 to the gas company management platform 130-1.

The gas user platform 160 refers to a platform for interacting with a gas user. In some embodiments, the gas user platform 160 is configured as a terminal device.

The gas user platform 160 may be configured to record usage information of the gas user. The gas user may include an enterprise user, a general gas user (i.e., the gas user), or the like.

In some embodiments, the gas user platform 160 is configured to send the at least one maintenance instruction to the corresponding target enterprise user, respectively.

In some embodiments, the gas user platform 160 may exchange information and/or data with the gas company management platform 130-1 via the gas service platform 170. For example, the gas company management platform 130-1 may send the maintenance instruction to the gas user platform 160 via the gas service platform 170 for sending to the target enterprise user corresponding to the maintenance instruction.

The gas service platform 170 refers to a platform for communicating the data of the gas user platform 160 and is an interface platform for realizing the interaction between the gas company management platform 130-1 and the gas user platform 160.

In some embodiments, the gas service platform 170 is configured to interact with the gas company management platform 130-1 and the gas user platform 160 for data.

It should be noted that the above description of the intelligent gas IOTs system 100 is for descriptive convenience only and does not limit the present disclosure to the scope of the cited embodiments.

Figure 2:
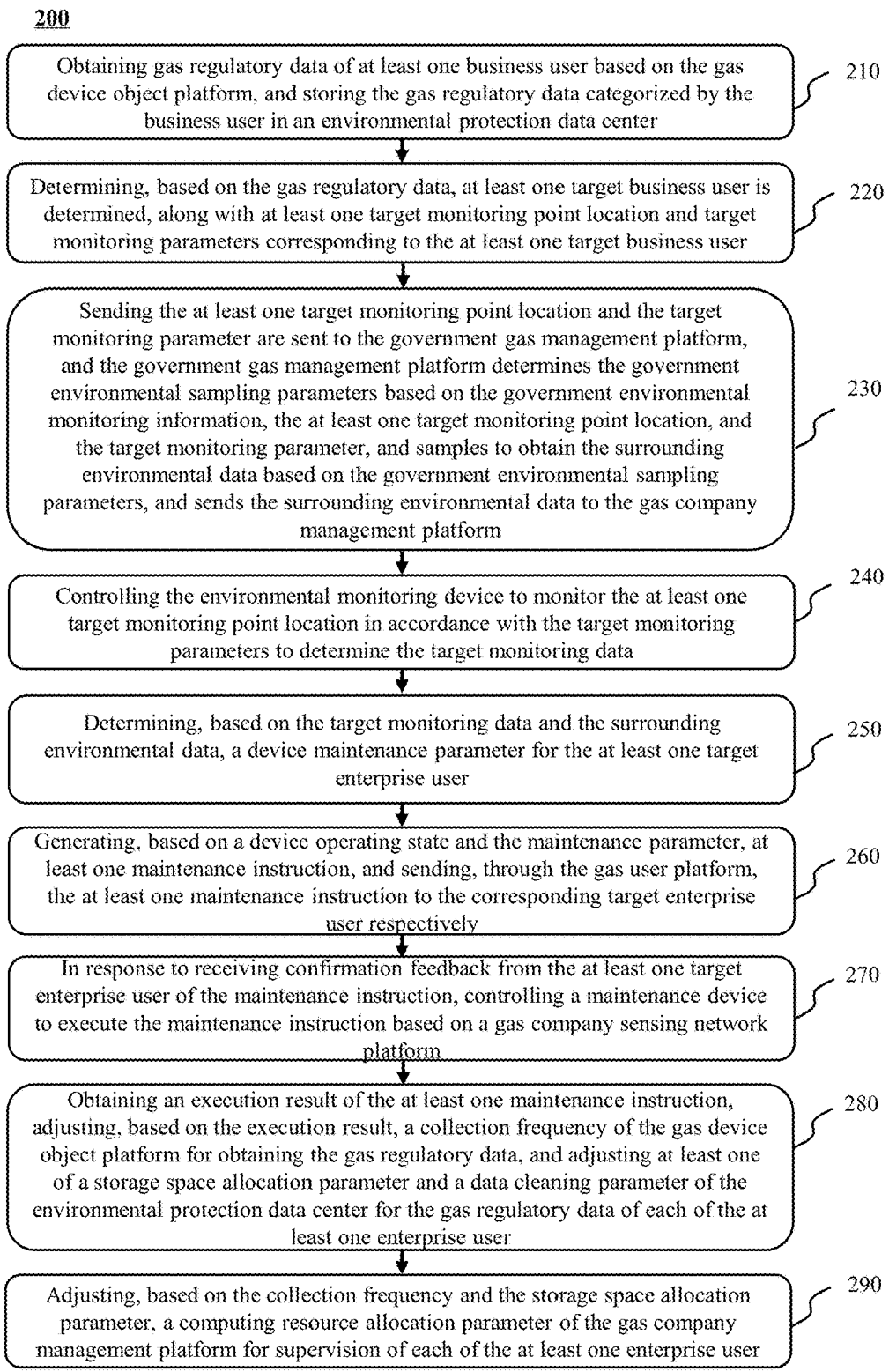
FIG. 2 is a flowchart illustrating a process of environmental monitoring based on intelligent gas regulatory Internet of Things (IoTs) according to some embodiments of the present disclosure.

FIG. 2 is a flowchart illustrating a process of environmental monitoring based on intelligent gas regulatory IOTs according to some embodiments of the present disclosure. In some embodiments, the process 200 is performed by a gas company management platform of the intelligent gas IOTs system. As shown in FIG. 2, process 200 includes the following operations.

In 210, obtaining gas regulatory data of at least one enterprise user based on the gas device object platform, and storing the gas regulatory data categorized by the enterprise user in an environmental protection data center.

More descriptions of the gas device object platform may be found in FIG. 1 and related descriptions thereof. The gas device object platform may measure the gas regulatory data of different types of gas devices through the gas monitoring sensor.

The enterprise user may include an enterprise that uses gas for production, processing, and manufacturing activities. The enterprise user may also include a company that extracts and produces gas and operate and manage gas services. For example, the enterprise user may include gas supply companies, companies related to the construction of gas works and the installation of device.

The gas regulatory data refers to data related to the regulation of gas usage by the enterprise users. For each enterprise user, the corresponding gas regulatory data may be obtained. In some embodiments, the gas regulatory data may include at least one of the gas usage data, exhaust gas emission, and exhaust gas treatment device operation data.

In some embodiments, the gas usage data includes gas usage of the different types of gas device at different times.

The exhaust gas emission refers to an amount of exhaust gas produced by gas combustion. The exhaust gas emission may be expressed in terms of gas volume. In some embodiments, the exhaust gas emission is obtained by a flow rate sensor configured by the gas device object platform. The flow rate sensor may be configured to measure the gas flow rate and the exhaust gas emission may be determined from the gas flow rate and a cross-sectional area of the gas channel.

The exhaust gas treatment device operating data is data related to the waste treatment plant in operation. In some embodiments, the exhaust gas treatment device operation data may include operation periods of the exhaust gas treatment device, operation power, or the like.

The exhaust gas treatment device refers to device that uses different process technologies to treat exhaust gases in order to reduce the pollution of exhaust gases. For example, the exhaust gas treatment device may include electrostatic dust removal device, catalytic combustion device, photooxidative catalytic device, or the like.

The environmental protection data center is used to aggregate and store data. In some embodiments, the environmental protection data center may be set up in the gas company management platform and used to aggregate and store the gas regulatory data. More descriptions of the gas company management platform may be found in the related descriptions in FIG. 1.

In some embodiments, the gas device object platform may categorize and store gas data in different partitions of the environmental protection data center according to the enterprise user. For example, the gas device object platform stores gas data of a same enterprise user in a same partition and different enterprise users in different partitions.

In some embodiments, the gas device object platform may also store different types of data in the gas monitoring data into different partitions in the storage space according to data type. For example, if the gas regulatory data of the enterprise user X is stored to a corresponding partition A, the gas usage data of the enterprise user X may be stored to a sub-partition A-1 below the partition A, the exhaust gas emission of the enterprise user X may be stored to a sub-partition A-2, and the exhaust gas treatment device operation data of the enterprise user X may be stored to a sub-partition A-3.

In 220, determining, based on the gas regulatory data, at least one target enterprise user and at least one target monitoring point location and target monitoring parameters corresponding to the at least one target enterprise user.

The target enterprise user refers to an enterprise user who needs further environmental monitoring. If there is an anomaly in the gas regulatory data for the enterprise user, the further environmental monitoring is required for the enterprise user, which may be the target enterprise user.

The target monitoring point location refers to a point location where the target monitoring device is activated for monitoring. The target monitoring device refers to an environmental monitoring device that is enabled for environmental monitoring among the multiple environmental monitoring device configured by the enterprise user.

The environmental monitoring device refers to an device used to monitor pollution in the environment. In some embodiments, the environmental monitoring device may include an air and exhaust gas testing device, a water quality testing device, a soil testing device, or the like.

In some embodiments, the environmental monitoring device includes at least one of a fixed monitoring device and a mobile monitoring device. The fixed monitoring device refers to an environmental monitoring device with a fixed location. The mobile monitoring device refers to an environmental monitoring device that is not fixed in location. In some embodiments, the mobile monitoring device may be an environmental monitoring device mounted on a movable device such as a drone, an environmental monitoring vehicle, or the like.

In some embodiments, the target monitoring point location may include at least one of a fixed monitoring point location and a mobile monitoring point location. The fixed monitoring point location refers to a point location where the fixed monitoring device is activated for monitoring. The multiple fixed monitoring devices are pre-installed at the multiple installation location points in the region of the enterprise user. When the installation location point is identified as the fixed monitoring point location (e.g., the fixed monitoring device at the installation location point is activated), the fixed monitoring device at the installation location point monitors according to the target monitoring parameter. When the installation location point is not identified as the fixed monitoring point location, the fixed monitoring device at the installation location point is not monitored or is monitored at the very low monitoring frequency (e.g., once a week, once a month, etc.).

The mobile monitoring point location refers to a point location where the mobile monitoring device is activated for monitoring. After determining the mobile monitoring point location, the gas company management platform may control the mobile monitoring device to move to the mobile monitoring point location for environmental monitoring.

The target monitoring parameter refers to a parameter that control the monitoring performed by the target monitoring device. In some embodiments, the target monitoring parameter may include a monitoring period for the target monitoring device, a monitoring frequency for the different monitoring periods, or the like. For the target monitoring device, it is necessary to set up the monitoring period and the monitoring frequency due to the limited range of mobile device such as drones and the limited number of the mobile monitoring device itself, which does not allow for continuous monitoring.

In some embodiments, the gas company management platform may determine the at least one target enterprise user, and the at least one target monitoring point location and the target monitoring parameter corresponding to the at least one target enterprise user based on the gas regulatory data and the historical reference value.

In some embodiments, the gas company management platform may designate an enterprise user whose at least one of the gas usage data and the exhaust gas emission exceeds a corresponding historical reference value as the target enterprise user. In some embodiments, the gas company management platform may designate an enterprise user whose exhaust gas treatment device operating data is lower than the corresponding historical reference value as the target enterprise user.

The historical reference value refers to a reference value used to determine whether to use the gas regulatory data as the target enterprise user. In some embodiments, each of the gas usage data, the exhaust gas emission, and the exhaust gas treatment device operation data may correspond to a historical reference value, respectively. The historical reference value may be a historical average of the corresponding data. If either of the gas usage data or the exhaust gas emission exceeds the corresponding historical reference value, the enterprise user is likely to have a relatively great environmental impact and requires focused monitoring. If the exhaust gas treatment device operating data is lower than the corresponding historical reference value, the enterprise user may not be treating the gas exhaust sufficiently, and focused monitoring is also required.

In some embodiments of the present disclosure, the gas company management platform may determine a count of monitoring point locations needed based on a difference between the gas regulatory data of the target enterprise user and the historical reference value of the target enterprise user. If the difference between the gas regulatory data and the historical reference value is greater, the greater the number of monitoring point locations required.

In some embodiments of the present disclosure, the gas company management platform may enable a corresponding number of fixed monitoring point locations based on a desired count of monitoring point locations. The intervals between the enabled fixed monitoring point locations may be evenly distributed and up to all of the fixed monitoring devices may be enabled.

In some embodiments of the present disclosure, when the total count of installation location points of the fixed monitoring device of the target enterprise user is less than the count of monitoring point locations needed, the gas company management platform may enable the mobile monitoring point locations to be supplemented, and the locations of the mobile monitoring point locations may be evenly arranged between the intervals of the fixed monitoring point locations.

In some embodiments of the present disclosure, the gas company management platform may determine the corresponding target monitoring parameters for the different target monitoring point locations. In some embodiments of the present disclosure, the gas company management platform may determine the target monitoring parameter corresponding to the fixed monitoring point location based on the preset monitoring frequency. For example, the gas company management platform may determine the gas use time period as the monitoring period corresponding to the fixed monitoring point locations, and determine the preset monitoring frequency as the monitoring frequency corresponding to the fixed monitoring point locations. In some embodiments of the present disclosure, the gas company management platform may determine the target monitoring parameter corresponding to the mobile monitoring point location based on the range of the mobile monitoring device. For example, the gas company management platform may determine the gas usage period as the monitoring period corresponding to the mobile monitoring point location, and determine the monitoring frequency corresponding to the mobile monitoring point location based on the length of the monitoring period and the endurance of the device. The better the endurance of the device and the shorter the length of the monitoring period, the greater the monitoring frequency may be. The gas usage period refers to a time period during which the gas is used by the enterprise user.

In some embodiments of the present disclosure, the gas company management platform may also determine the at least one target enterprise user by determining the matching degree between the gas usage data and the exhaust gas emission, and the exhaust gas treatment device operation data. More descriptions of how to identify the target enterprise user by the matching degree may be found in FIG. 3 and the related descriptions.

In 230, sending the at least one target monitoring point location and the target monitoring parameter, determining, through the government gas management platform, a government environmental sampling parameter based on the government environmental monitoring information, the at least one target monitoring point location, and the target monitoring parameter, sampling based on the government environmental sampling parameter to obtain surrounding environmental data, and sending the surrounding environmental data to the gas company management platform.

In some embodiments of the present disclosure, the gas company management platform may send the at least one target monitoring point location and the target monitoring parameters to the government gas management platform. For example, the gas company management platform may transmit the at least one target monitoring point location and the target monitoring parameter to the government gas management platform through the government supervision sensor network platform. More descriptions of the government gas management platform may be found in FIG. 1 and the related descriptions.

The government environmental monitoring information refers to information related to the environmental protection facility set up by the government environmental monitoring department (referred to as the environmental protection department). In some embodiments of the present disclosure, the government environmental monitoring information includes the governmental monitoring point locations and types of the governmental monitoring device arranged by the environmental protection department in the natural environment. The governmental monitoring point locations are the monitoring locations arranged by the environmental protection department, and the governmental monitoring device is an environmental monitoring device arranged by the environmental protection department.

The government environmental sampling parameter refers to a parameter that control the sampling of the environment by the governmental monitoring device. For example, the government environmental sampling parameter includes the time period and frequency that control the sampling of the environment by the governmental monitoring device. It should be noted that the location of the governmental monitoring device for monitoring is not affected by the gas company. However, the sampling data of the governmental monitoring device may be adjusted according to the requirements of the gas company, which can satisfy the requirements of the government environmental protection monitoring and obtain the surrounding environmental data that meets the needs of the target enterprise user.

In some embodiments of the present disclosure, the government gas management platform may obtain at least one surrounding monitoring device based on the location of the at least one target monitoring point location, and match in the government environmental monitoring information based on a predetermined distance. The surrounding monitoring device refers to a governmental monitoring device located around with the target monitoring point location. In some embodiments of the present disclosure, the government gas management platform may use the monitoring period and the monitoring frequency in the target monitoring parameters as the monitoring period and the monitoring frequency of the surrounding monitoring device to obtain the government environmental sampling parameter.

The surrounding environmental data refers to environmental monitoring data that belongs to the region where the target enterprise user is located among the data monitored by the environmental protection department. For example, the surrounding environmental data may be air quality, types, and levels of air pollutants (e.g., sulfides, nitrogen compounds, etc.) in the region where the target enterprise user is located. In some embodiments of the present disclosure, the surrounding environmental data may be environmental monitoring data within a certain range around the location of the target enterprise user, such as using the location of the target enterprise user as a center of the circle, within a circle consisting of 100 meters, 500 meters, 1 kilometer, 3 kilometers, 5 kilometers, or 10 kilometers in radius. In some embodiments of the present disclosure, the government gas management platform may control the surrounding monitoring device to sample according to the government environmental sampling parameter, obtain the surrounding environmental data, and send the surrounding environmental data to the gas company management platform via the government supervision sensor network platform.

In 240 controlling an environmental monitoring device to monitor the at least one target monitoring point location according to the target monitoring parameter to determine the target monitoring data.

The target monitoring data refers to environmental monitoring data obtained by monitoring in the where the target enterprise user is located. In some embodiments of the present disclosure, the target monitoring data may include exhaust gas type, exhaust gas content, or the like. In some embodiments of the present disclosure, the exhaust gas species may include sulfides, nitrogen oxides, or the like.

In some embodiments of the present disclosure, the gas company management platform may control, based on the target monitoring parameters, the environmental monitoring device of the corresponding target monitoring point location to perform monitoring according to the monitoring frequency during the monitoring period to obtain the target monitoring data.

In 250, determining, based on the target monitoring data and the surrounding environmental data, a device maintenance parameter for the at least one target enterprise user.

More descriptions of the gas device and the exhaust gas treatment device may be found in FIGS. 1 and 2 and the related descriptions.

The device maintenance parameter refers to a parameter for maintaining and servicing the device. In some embodiments of the present disclosure, the device maintenance parameter may include a maintenance parameter for the gas device and/or a maintenance parameter for the exhaust gas treatment device. In some embodiments of the present disclosure, the maintenance parameter may include a maintenance process and a maintenance time. In some embodiments of the present disclosure, the maintenance device configured for performing the maintenance may include the cleaning device, the overhauling device, or the like.

The maintenance process refers to a process for maintaining and servicing the device. In some embodiments of the present disclosure, the maintenance process may include device cleaning, consumable replacement, device overhaul, device upgrading, or any combination thereof. The device cleaning and consumables replacement are maintenance processes with a relatively low maintenance, while the device overhaul and device upgrading are maintenance processes with a relatively high maintenance intensity.

The maintenance time refers to a time for maintaining and servicing the device. The maintenance time may correspond to the maintenance process, and the different maintenance processes require different maintenance times.

In some embodiments of the present disclosure, in response to determining that the exhaust gas content of the target monitoring data is greater than a content threshold and the pollutant content in the surrounding environmental data is abnormally elevated, the gas company management platform may determine the maintenance parameter based on the last maintenance time and the last maintenance process. If the last maintenance process was device cleaning or consumable replacement and a time between the last maintenance time and the present time has exceeded the device cleaning cycle and consumable replacement cycle, the current maintenance process is determined to be the device cleaning and/or consumable replacement, and the current maintenance time is determined to be the most recent non-productive time for the target enterprise user. If the time between the last maintenance time and the present time does not exceed the device cleaning cycle and consumables replacement cycle, the current maintenance process is determined to be the device overhaul, and whether there is a need for device upgrades is determined based on the result of the device overhaul. If there are no problems with the service, but the exhaust gas level is relatively high, the device no longer meets the demand, and the device needs to be replaced. At the same time, the maintenance time is determined to be the nearest non-productive time for the target enterprise user.

According to some embodiments of the present disclosure, the gas company management platform may also determine the device maintenance parameter by determining the device operating state. More descriptions of how to determine the device maintenance parameter from the device operating state may be found in FIG. 5 and the related descriptions.

In 260, generating, based on a device operating state and the maintenance parameter, at least one maintenance instruction, and sending, through the gas user platform, the at least one maintenance instruction to the corresponding target enterprise user respectively.

The device operating state is a degree to which the current operating effect of the device is capable of achieving a standard operating effect. The standard operating effect may be an operating effect of the new device. For example, the device operating state may be such that the current operating effect reaches 20% of the standard operating effect.

More descriptions of how to determine the device operating state may be found in the descriptions related to machine science in FIG. 5, which will not be repeated here.

The maintenance instruction refers to an instruction used to perform maintenance processing on device. According to some embodiments of the present disclosure, the maintenance instruction may include maintaining the device (e.g., the gas device and/or the exhaust gas treatment device) according to the maintenance process and the maintenance time.

According to some embodiments of the present disclosure, the gas company management platform may generate at least one maintenance instruction based on the device operating state and the device maintenance parameter. For example, if the device operating state is poor, the maintenance instruction may be generated based on the device maintenance parameter.

According to some embodiments of the present disclosure, for each target enterprise user, the gas company management platform may determine the maintenance instruction corresponding to the target enterprise user and send the maintenance instruction to the target enterprise user via the gas user platform. More descriptions of the gas user platform may be found in FIG. 1 and the related descriptions.

In 270, in response to receiving confirmation feedback from the at least one target enterprise user of the maintenance instruction, controlling the maintenance device to execute the maintenance instruction based on a gas company sensing network platform.

When the target enterprise user sends the confirmation feedback on the maintenance instruction, it indicates that the target enterprise user agrees to perform maintenance according to the maintenance instruction. The gas company management platform may receive the confirmation feedback of the maintenance instruction from the target enterprise user through the gas service platform.

More descriptions of the gas company sensing network platform and the gas device object platform may be found in FIG. 1 and the related descriptions.

In 280, obtaining an execution result of the at least one maintenance instruction, based on the execution result, a collection frequency of the gas device object platform for obtaining the gas regulatory data, and adjusting at least one of storage space allocation parameter and a data cleaning parameter of the environmental protection data center for the gas regulatory data of each of the at least one enterprise users.

The execution result refers to a feedback on the execution of the maintenance instruction. The execution result may include results of whether the target enterprise user performed the maintenance on time and whether the target enterprise user perform maintenance according to the maintenance process. According to some embodiments of the present disclosure, the gas company management platform may adjust the actual execution of the maintenance instruction according to the actual situation of the enterprise. For example, the gas company management platform may adjust the execution time of the maintenance instruction according to the production needs of the company.

In some embodiments, there may be more than one execution result of the same maintenance instruction. For example, if the maintenance instruction is executed for the first time and it is not possible to execute the instruction due to the actual situation, the execution result may be "Delayed execution and next execution time." When the instruction is executed for the next time, the execution result may be updated to "Execution Completed and Execution Completion Time."

In some embodiments, the gas company management platform may obtain the execution result of the maintenance instruction via the gas company sensor network platform.

The collection frequency refers to a frequency at which the gas device object platform acquires the gas regulatory data. In some embodiments, the gas device object platform may acquire the gas regulatory data at a certain collection frequency, such as daily, weekly, or the like.

In some embodiments, in response to determining that an execution result indicates that the maintenance instruction has been executed, the gas company management platform may turn down the collection frequency. The execution of maintenance instructions is unlikely to lead to immediate issues, thus reducing the need for high-frequency supervision and conserving regulatory resources, e.g., storage and computing resources.

In some embodiments, in response to determining that the execution result indicates that the maintenance instruction has been executed, the gas company management platform may adjust the collection frequency based on the maintenance process in the maintenance instruction. For example, if the maintenance process is pipeline cleaning and consumables replacement, the gas company management platform may determine the collection frequency according to the device cleaning cycle or consumables replacement cycle. When in the device cleaning cycle or consumables replacement cycle, the collection frequency may be adjusted to a low-frequency regulation; when not in the device cleaning cycle or consumables replacement cycle, the collection frequency may be adjusted to a high-frequency regulation. A regulation where the collection frequency is less than a first frequency threshold may be the low-frequency regulation and a regulation where the collection frequency is greater than a second frequency threshold may be the high-frequency regulation. The first frequency threshold is less than or equal to the second frequency threshold. The first frequency threshold and the second frequency threshold may be a system default, a human preset value, or the like.

The storage space allocation parameter is a size of a storage space for the partitions in the environmental protection data center.

In some embodiments, the gas company management platform may determine the storage space allocation parameter based on the collection frequency. For example, the gas company management platform may calculate the data volume of gas regulatory data of different enterprise users in the same time period based on the collection frequency, and allocate the storage space size according to the ratio of the data volume size. The higher the collection frequency and the more data collected, the more storage space is allocated.

The data cleaning parameter is a parameter for data cleansing by the environmental protection data center. In some embodiments, the data cleaning parameter may include cleaning time, cleaning frequency, or the like. In some embodiments, if the execution result is a confirmation that the maintenance instruction has actually been executed to completion, the gas company management platform may determine that the cleanup time is to immediately clean up the gas regulatory data used in the last determination of the maintenance parameter.

In 290, adjusting based on the collection frequency and the storage space allocation parameters, a computing resource allocation parameter of the gas company management platform for supervision of each of the at least one enterprise user.

The computing resource allocation parameter is a parameter related to the calculation and processing of the gas regulatory data of the enterprise users by the gas company management platform.

In some embodiments, the higher the collection frequency and the larger the partitioned storage space, the more computing resources may be allocated to the enterprise user. The higher the collection frequency, the larger the data volume of the collected the gas regulatory data; the larger the storage space, the larger the data volume of the stored gas monitoring data. For such enterprise user, it is even more important to process the stored gas regulatory data in a timely manner. In general, the enterprise user with a relatively high collection frequency has an environmental risk with a higher possibility, which has the greater need for timely processing of the gas regulatory data to strengthen its environmental protection supervision.

In the embodiments of the present disclosure, the gas regulatory data of the different enterprise users can be analyzed to dynamically assess the impact and risk of the user in terms of environmental protection, and to carry out maintenance treatments in the presence of risk, in order to meet the need to effectively reduce environmental pollution.

FIG. 3 is a flowchart illustrating a process of determining a target enterprise user according to some embodiments of the present disclosure. In some embodiments, the process 300 may be performed by a gas company management platform. As shown in FIG. 3, process 300 includes the following operations.

In 310, for each of the at least one enterprise user, determining, based on the gas regulatory data corresponding to the enterprise user, a matching degree between the gas usage data and the exhaust gas emission with the exhaust gas treatment device operation data.

More descriptions of the enterprise user, the gas regulatory data, the gas usage data, the exhaust gas emission and the exhaust gas treatment device operation data may be found in FIG. 2 and the related descriptions, which may not be repeated here.

The matching degree is data used to characterize the conformity between exhaust gas treatment and gas use. In some embodiments, the matching degree may be a result of fusion of a first matching degree between the gas usage data and the exhaust gas treatment device operation data and a second matching degree between the exhaust gas emission and the exhaust gas treatment device operation data. For example, the matching degree may be a weighted or summed result of the first matching degree and the second matching degree. The weight may be system presets or human presets, or the like.

In some embodiments, the gas company management platform may determine the matching degree in a variety of ways.

In some embodiments, in response to determining that a gas usage duration in the gas usage data does not exceed the operating time of the exhaust gas treatment device, the first matching degree may be determined based on the time difference between the gas usage duration and the operating duration of the exhaust gas treatment equipment in the gas usage data. More descriptions of the length of gas usage may be found in the subsequent descriptions.

In some embodiments, in response to determining that a gas usage duration in the gas usage data does not exceed the operating time of the exhaust gas treatment device, the second matching degree may be determined based on the difference between the exhaust gas emission and the operating power of the exhaust gas treatment device. For example, the gas company management platform may determine the exhaust gas emission power based on the exhaust gas emissions per unit of time, and then compare the exhaust gas emission power with the operating power of the exhaust gas treatment device to determine the difference. If the difference is smaller, the corresponding matching degree is higher. If the duration of operation of the treatment device exceeds the duration of gas use and the power of operation exceeds the power specified by the exhaust gas emissions, it may be considered as no difference, the corresponding second matching degree or first matching degree is highest.

In some embodiments, the gas company management platform may determine gas segmentation data and exhaust gas segmentation data for different continuous usage periods by dividing the gas usage data and the exhaust gas emission according to the continuous usage periods; determine, based on the gas segmentation data and the exhaust gas segmentation data, whether there is an exhaust gas treatment demand for each continuous usage period; and determine the matching degree based on the exhaust gas treatment demand and the exhaust gas treatment operating data.

The continuous usage period refers to a period of time when gas use is not interrupted. The gas company management platform may directly extract the continuous time period in which the gas usage data exists.

The gas segmentation data refers to gas usage data corresponding to the continuous usage period. For example, the gas segmentation data includes the amount of gas used during the continuous usage period. The exhaust gas segmentation data refers to the exhaust gas emission corresponding to the continuous usage period.

The exhaust gas treatment demand refers to requirements for exhaust gas treatment. If the gas itself can be burned sufficiently or the gas usage is very small (e.g., equivalent to only a few average users for one day), the exhaust gas treatment demand may be no demand. Since the activation of the exhaust gas treatment device consumes electricity, accelerates the aging of the device, and is not environmentally friendly. Therefore, it is not necessary to turn on the exhaust gas treatment device every time the gas is used. If only a small amount of gas is used and no other production emissions are generated, there is no need to require the switching on of the exhaust gas treatment device.

In some embodiments, the gas company management platform may set a minimum gas flow rate based on requirements and historical experience of the exhaust gas emission; calculate the minimum gas volume and the minimum exhaust gas volume for the different continuous usage periods based on the minimum gas flow rate; and determine that there is a need for exhaust gas treatment if the gas segmented use data exceeds the minimum gas flow rate or the exhaust gas segmentation data exceeds the minimum exhaust gas volume.

In some embodiments, the gas company management platform may use a product of the minimum gas flow rate and the duration as a minimum gas volume, and then determine the minimum exhaust gas volume based on the minimum gas volume. For example, if the gas company management platform predicts that 1 L of gas produces 1.2 liters of exhaust gas upon complete combustion based on experience, the minimum exhaust gas volume may be calculated as 120% of the minimum gas volume.

In some embodiments of the present disclosure, the gas company management platform may determine the exhaust gas treatment demand based on a combustion adequacy degree. The combustion adequacy degree refers to the adequacy of gas combustion. Inadequate combustion of gas produces exhaust gases that pollute the atmosphere. If the gas can be burned sufficiently, the exhaust gas treatment is not required. Therefore, the exhaust gas treatment demand is related to the combustion adequacy degree.

In some embodiments of the present disclosure, the gas company management platform may evaluate, based on the gas segmentation data and the exhaust gas segmentation data, the combustion adequacy degree for each of the continuous usage periods, and determine the exhaust gas treatment demands based on the combustion adequacy degree and the gas segmentation data for each of the continuous usage periods.

In some embodiments of the present disclosure, the gas company management platform may calculate a theoretical amount of exhaust gas after full combustion based on the gas usage in the gas segmentation data, and determine the combustion adequacy degree based on a ratio of the theoretical amount of exhaust gas to the amount of exhaust gas in the exhaust gas segmentation data. The theoretical volume of exhaust gases after full combustion may be calculated empirically.

In some embodiments of the present disclosure, the gas company management platform may identify an exhaust gas treatment demand of the combustion adequacy degree being less than a predetermined adequacy threshold (e.g., 95%) and the gas usage in the gas segmentation data being less than a minimum gas volume as having the exhaust gas treatment demand.

In some embodiments of the present disclosure, the exhaust gas treatment demand is also related to a current atmosphere self-cleaning capacity. The lower the atmosphere self-cleaning capacity, the higher the exhaust gas treatment demand for the same combustion adequacy degree. For example, the exhaust gas treatment demand may change from no demand to demand. The atmosphere self-cleaning capacity is an ability of atmospheric pollutants to be removed from the atmosphere or reduced in concentration by natural processes. The atmosphere self-cleaning capacity may be determined by obtaining statistical data from the environmental protection department through the government supervision and management platform.

In the embodiments of the present disclosure, determining the exhaust gas treatment demand by calculating the combustion adequacy degree enables more accurate result in determining the exhaust gas treatment demand.

In some embodiments of the present disclosure, the gas company management platform may determine the matching degree based on the exhaust gas treatment demands and waste treatment device operation data.

In some embodiments of the present disclosure, the gas company management platform may treat the exhaust gas treatment demand as the continuous usage period with demand, determine a sub-match degree for each continuous usage period separately in accordance with the process of determining the matching degree described above, and average the sub-matches to obtain the matching degree. For example, the gas company management platform may determine a sub-match for the continuous usage period based on a difference in duration between the duration of each continuous usage period and the duration of operation of the exhaust gas treatment device; or a sub-match for the continuous usage period based on a difference between the exhaust gas segmentation data for each continuous usage period and the power of operation of the exhaust gas treatment device.

In the embodiments of the present disclosure, segmenting the gas usage data and the exhaust gas emission allows for determining the matching degree corresponding to each segment, and more accurately determining whether the enterprise user requires further monitoring to assess its environmental risk.

In 320, determining the at least one target enterprise user based on the matching degree.

In some embodiments of the present disclosure, the gas company management platform may identify the target enterprise user whose matching degree is below a matching threshold. Matching thresholds may be preset based on experience.

In some embodiments of the present disclosure, the gas company management platform may designate at least one enterprise user with the matching degree below a first matching threshold or the matching degree above a second matching threshold as the at least one target enterprise user. Both the first matching threshold and the second matching threshold may be preset, and the first matching threshold is lower than the second matching threshold.

A low level of the matching degree indicates that there is a high level of inconsistency between the exhaust gas treatment and the gas use and/or the volume of exhaust gas, possibly because the enterprise user may not be treating the exhaust gas as required and needs to be monitored more closely. A high level of the matching degree indicates that the enterprise user's exhaust gas treatment device is operating under a heavy load, which may result in excessive device wear and tear and poor exhaust gas treatment effect, and also requires focused monitoring.

In the embodiments of the present disclosure, the results of determining the target enterprise user by the first matching threshold and the second matching threshold are more accurate, which is beneficial for assessing the environmental risk of the enterprise user.

In some embodiments of the present disclosure, the first matching threshold and the second matching threshold may be adjusted based on a historical environmental pollution value of the at least one enterprise user. The higher the historical environmental pollution value, the higher the likelihood that the exhaust gas emissions of the enterprise user do not comply with the requirements, and the gas company management platform may adjust the preset first matching threshold upward, and adjust the preset second matching threshold downward, in order to focus on monitoring the enterprise user with the higher historical environmental pollution value as the target enterprise user as much as possible. More descriptions regarding the environmental pollution value may be found in FIG. 5 and its associated description.

In embodiments of the present disclosure, the results of determining the target enterprise user through the historical environmental pollution value is more accurate and facilitate the assessment of the environmental risk of the enterprise user.

In some embodiments of the present disclosure, the gas company management platform may determine a degree of sub-matching between gas segmentation data and exhaust gas segmentation data with the exhaust gas treatment device operating data during multiple continuous usage periods; determine an environmental value for the at least one enterprise user based on a degree of sub-matching corresponding to the multiple continuous usage periods; and adjust the at least one target enterprise user based on the environmental value.

The environmental value is the degree of environmental friendliness of the gas used in the business. The environmental value may be used as a numerical value to characterize the degree of standardization of a company's waste gas treatment.

In some embodiments of the present disclosure, the gas company management platform may determine an environmental value for the enterprise user in a variety of ways based on the degree of sub-matching corresponding to the plurality of continuous usage periods. For example, taking the plurality as the enterprise user's environmental value, taking the sum result as the enterprise user's environmental value, and so on.

In some embodiments of the present disclosure, the gas company management platform may determine the environmental value by a weighted summation based on the degree of sub-matching for the multiple continuous usage periods, wherein a weight of the weighted summation is determined based on the gas segmentation data during the multiple continuous usage periods. The higher the gas usage in the gas segmentation data, the more the company is required to standardize the gas exhaust treatment, so the higher the gas usage the higher the weight corresponding to the continuous usage period.

In embodiments of the present disclosure, adjusting the target users by the environmental value can accurately identify the target enterprise users with higher environmental risks.

In 330, determining the at least one target monitoring point location and the target monitoring parameters corresponding to the at least one target enterprise user based on gas regulatory data of the at least one target enterprise user.

More descriptions regarding the target monitoring point location and the target monitoring parameter may be found in FIG. 2 and related description thereof.

In some embodiments of the present disclosure, the gas company management platform may determine an environmentally sensitive region based on the environmental information of the at least one target enterprise user; determining, based on the environmentally sensitive region, at least one set of candidate monitoring point locations and corresponding candidate monitoring parameters; assessing a data adequacy degree of environmental monitoring data under the at least one set of candidate monitoring point locations and corresponding candidate monitoring parameters based on a data assessment model; determining the at least one target monitoring point location and target monitoring parameter based on the data adequacy degree.

The environmentally sensitive region is a region where the quality of the environment is significantly affected by the pollutants in the exhaust gas, such as regions where surrounding lakes, and rivers are located (pollutants such as sulfides and nitrogen compounds are easily soluble in water), regions where people congregate, and regions where people live (pollutants may directly affect people's health).

In some embodiments, the gas company management platform may select a number of points as a set of candidate monitoring point locations according to different monitoring densities between the environmentally sensitive region and the target enterprise user, and determine the corresponding candidate monitoring parameter according to the process for determining the target monitoring parameter in FIG. 2. Monitoring density may be expressed as the spacing between candidate environmental monitoring point locations of the same type (e.g., both fixed or mobile point locations); the greater the spacing, the lower the monitoring density.

The data adequacy degree refers to a value of environmental monitoring data used to assess the adequacy of an organization's exhaust gas treatment effect. The environmental monitoring data is monitored by a set of candidate monitoring point locations and the candidate monitoring parameters.

The data assessment model refers to a model used for the data adequacy degree. In some embodiments, the data assessment model is a machine learning model, such as the convolutional neural network model, the time series model, the Deep Neural Network (DNN) model, or a combination thereof.

Figure 4:
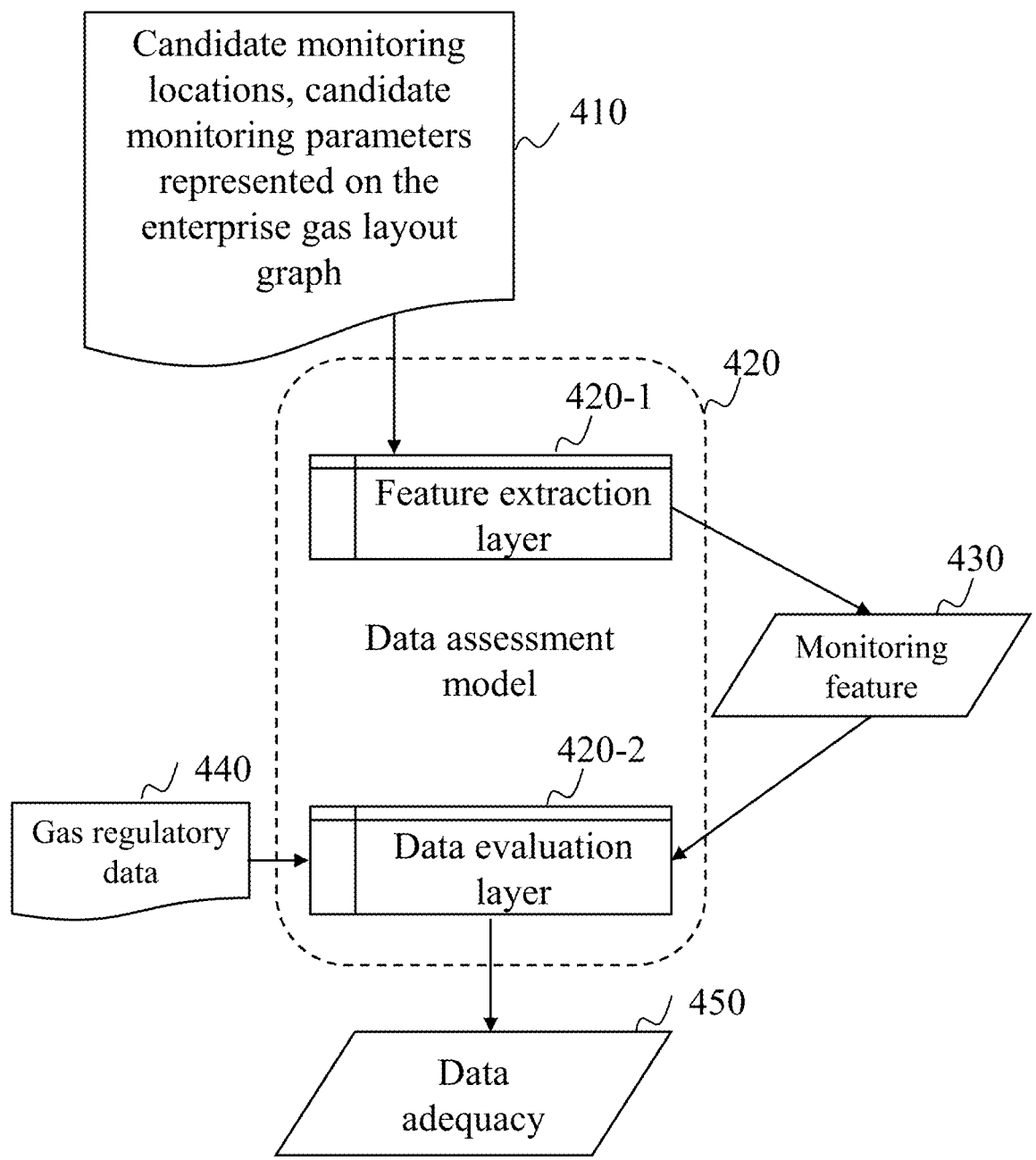
FIG. 4 is a schematic diagram illustrating a data assessment model according to some embodiments of the present disclosure.

In some embodiments, as shown in FIG. 4, the data assessment model 420 may include a feature extraction layer 420-1 and a data evaluation layer 420-2. Both the feature extraction layer 420-1 and the data evaluation layer 420-2 may be the DNN models.

In some embodiments, inputs to the feature extraction layer 420-1 may include candidate monitoring point locations, candidate monitoring parameters 410 represented on the enterprise gas layout graph, and outputs of the feature extraction layer 420-1 may include a monitoring feature 430.

The enterprise gas layout graph refers to a layout graph that includes coordinate information for points such as the gas device, the exhaust gas treatment device, the exhaust gas emission point location, and the target monitoring point location within the target enterprise. The candidate monitoring point locations may be marked on an enterprise gas layout graph based on coordinate information.

The monitoring features 430 may be used to characterize a monitoring intensity of a business by the candidate monitoring point locations and the candidate monitoring parameters. The more even and comprehensive the candidate monitoring point locations are on the enterprise layout map, the higher the monitoring of the target enterprise users.

In some embodiments, the inputs to the data evaluation layer 420-2 may include a monitoring feature 430 and gas regulatory data 440, and the outputs of the data evaluation layer 420-2 may include a data adequacy degree 450.

In some embodiments, the feature extraction layer and the data evaluation layer of the data assessment model may be acquired by joint training based on a first training sample and a first training label. The first training sample of the data assessment model may include an actual monitoring point location, a monitoring parameter in the historical data, and the first training label may be an adequacy of the historical monitoring data obtained based on the first training sample. The adequacy of historical monitoring data is an extent to which historical monitoring data is used to assess the adequacy of the device operating state of the business's gas device and the exhaust gas treatment device. The degree of conformity between the device operating state at the time of actual maintenance by the maintenance personnel and the assessed device operating state is related to the data adequacy degree; the higher the degree of conformity, the higher the data adequacy degree.

In some embodiments, the process of joint training may include: inputting the first training sample into an initial feature extraction layer, obtaining a sample monitoring feature outputted by the initial feature extraction layer; inputting the sample monitoring feature as training sample data, and the sample gas regulatory data into an initial data evaluation layer, and obtaining a data adequacy degree outputted by the initial data evaluation layer. The loss function is constructed based on the sample regulatory features and the first training labels output from the initial feature extraction layer, and the parameters of the initial feature extraction layer and the initial data evaluation layer are synchronously updated. The trained feature extraction layer and the data evaluation layer are obtained by parameter updating.

In some embodiments, the gas company management platform may select a set of candidate monitoring point locations and candidate monitoring parameters with the data adequacy degree meeting a preset sufficiency requirement as the target monitoring point locations and target monitoring parameters, or a set of candidate monitoring point locations and candidate monitoring parameters with the highest data adequacy degree as the target monitoring point locations and target monitoring parameters. The preset sufficiency requirement is a predefined requirement used to screen the target monitoring point location and the target monitoring parameters.

In embodiments of the present disclosure, determining the data adequacy degree to determine the target monitoring point location and the target monitoring parameter through the data assessment model can improve the accuracy of the risk assessment of the target enterprise user.

In the embodiments of the present disclosure, identifying the target enterprise users by the matching degree can accurately identify the target enterprise users that need to be further monitored, which facilitates the risk assessment of the target enterprise users.

FIG. 5 is a flowchart illustrating a process of determining a device maintenance parameter according to some embodiments of the present disclosure. In some embodiments, a process 500 may be performed by a company management platform. As shown in FIG. 5, the process 500 may include the following operations.

In 510, determining the device operating state based on the target monitoring data, the surrounding environmental data, and an enterprise gas layout map of the at least one target enterprise user.

More descriptions of the target monitoring data, the surrounding environmental data, the device operating state, and the enterprise gas layout graph may be found in FIGS. 2 and 3 and the related descriptions, which may not be repeated here.

The exhaust gases generated from the combustion of gas in each gas device are treated by the corresponding exhaust gas treatment device. Each exhaust gas treatment device is discharged into the environment from the corresponding exhaust gas emission point location after treatment, so the environmental monitoring data near the exhaust gas emission point location may reflect the status of the gas device and the exhaust gas treatment device.

In some embodiments of the present disclosure, the gas company management platform may determine influence coefficients of the exhaust gas emission point location on the plurality of target monitoring point locations based on the distance between the target monitoring point location and the exhaust gas emission point location in the enterprise gas layout graph; determine a treatment effect of the exhaust gas discharged from the exhaust gas emission point location based on the target monitoring data of the plurality of target monitoring point locations and the influence coefficients corresponding to the target monitoring point locations; and determine the corresponding device operating state based on the exhaust gas treatment effect. The distance between the target monitoring point location and the exhaust gas emission point location is directly proportional to the influence coefficient, and the farther the distance, the greater the influence coefficient.

In some embodiments of the present disclosure, the gas company management platform may determine an exhaust gas treatment effect by calculating a sum of a product of the target monitoring data and a corresponding impact factor for each monitoring point location. The influence coefficient may be a system preset value, a human preset value, or the like. In some embodiments of the present disclosure, the gas company management platform may determine, based on the correspondence between the exhaust gas treatment effect and the device operating state, the device operating state corresponding to the current exhaust gas treatment effect. The correspondence between the exhaust gas treatment effect and the device operating state may be that the worse the exhaust gas treatment effect is, the worse the device operating state is.

In some embodiments of the present disclosure, the gas company management platform may determine an environmental pollution value of at least one exhaust gas emission point location based on the enterprise gas layout graph of the at least one target enterprise user and the target monitoring data; and determine the device operating state corresponding to the at least one exhaust gas emission point location based on the environmental pollution value of the at least one exhaust gas emission point location.

The exhaust gas emission point location refers to a point location where an exhaust gas discharge outlet of the target enterprise user is located. The environmental pollution value refers to a value that characterize a degree of environmental pollution at the different exhaust gas emission point locations. In some embodiments of the present disclosure, a total content of pollutant components in the exhaust gas emitted from the exhaust gas emission point location may be determined as the environmental pollution value.

In some embodiments of the present disclosure, the different exhaust gas emission point locations correspond to the different gas device and exhaust gas emission device; the higher the pollution value of the exhaust gas emission point location, the worse the device operating state of the corresponding gas device and the exhaust gas treatment device. In some embodiments of the present disclosure, the gas company management platform may count the historical device operating states corresponding to the different environmental pollution values based on the historical data and draw a state query table; according to the environmental pollution value, the device operating state corresponding to the environmental pollution values are queried in the state query table.

In embodiments of the present disclosure, by determining the environmental pollution value of the exhaust gas emission point location, the device operating state can be determined more accurately, and thus the maintenance parameter.

In some embodiments of the present disclosure, the gas company management platform may also construct a pollution analysis graph structure based on the at least one target monitoring point location, the exhaust gas emission point location, the target monitoring data, and the surrounding environmental data; input the pollution analysis graph structure into the pollution analysis model to determine the environmental pollution value.

The pollution analysis graph structure is a graph structure that represents the pollution at various points (e.g., the target monitoring point locations and the exhaust gas emission point locations), which may be represented by different types of nodes and edges connecting the nodes.

The nodes of the pollution analysis graph structure may include nodes corresponding to the target monitoring point locations (i.e., Class I nodes) and nodes corresponding to the exhaust gas emission point locations (i.e., Class II nodes). In some embodiments of the present disclosure, node characteristics of Class I nodes may include a nature of the target monitoring point location (e.g., a fixed location or a mobile location), the target monitoring data corresponding to the target monitoring point location. The node characteristics of Class II nodes may include a time of exhaust gas emission corresponding to the exhaust gas emission point location.

In some embodiments of the present disclosure, edges of the pollution analysis graph structure exist between the Class I nodes and the Class II nodes. Each Class II node may have an edge with one or more Class I nodes, while no edge exists between any two Class I nodes or between any two Class II nodes. In some embodiments of the present disclosure, characteristics of the edge may include a distance between the target monitoring point location and the exhaust monitoring location, a relative relationship (e.g., angle, direction) between the wind direction and the line connecting the two points, or the like.

In some embodiments of the present disclosure, the pollution analysis model is a machine learning model, such as a neural network model, a graph neural network model, a Graph Neural Network (GNN), or the like.

In some embodiments of the present disclosure, an input of the pollution analysis model may include a pollution analysis graph structure, and an output of the pollution analysis model may include an environmental pollution value for the Class II nodes. The environmental pollution value may be output by the Class II nodes of the pollution analysis model.

In some embodiments of the present disclosure, the pollution analysis model may be obtained by training based on training data.

In some embodiments, determining the training data for training the pollution analysis model may include: setting multiple sets of sample target monitoring point locations and corresponding sample target monitoring parameters for sample enterprises; monitoring a data adequacy degree of the target monitoring data under each of multiple sets of sample target monitoring point locations and the corresponding sample target monitoring parameters by a data assessment model and selecting a set of the sample target monitoring point locations and the corresponding sample target monitoring parameters for which the data adequacy degree meets a sufficiency requirement to construct a sample contamination analysis map as a second training sample, and determining a corresponding pollution value as a second training label.

In some embodiments, training of the pollution analysis model may include inputting the plurality of second training samples with a second training label into the initial pollution analysis model, constructing a loss function from the second label and the results of the initial pollution analysis model, and iteratively updating parameters of the initial pollution analysis model based on the loss function. When the loss function of the initial pollution analysis model meets a preset condition, the model training is completed and the trained pollution analysis model is obtained. The preset condition may be that the loss function converges, the number of iterations reaches a threshold, or the like.

The higher the data adequacy degree (e.g., meeting a preset sufficiency condition), the higher the accuracy of the sample contamination analysis graph corresponding to the environmental pollution value, and the higher the accuracy of the trained model. At the same time, due to the high temperature of the exhaust gas discharged from the exhaust gas discharge outlet, and the potential presence of other impurities, the sensor may not work properly, manual or mechanical sampling is necessary for determination; however, daily real-time monitoring may not meet such conditions, or the cost of monitoring may be too high. Therefore, the process is used for determining training samples to train the model to determine the environmental pollution value, rather than being able to directly obtain the environmental pollution value.

As the exhaust gas spreads in the air after it is discharged from the exhaust gas emission point location, the exhaust gas discharged from multiple exhaust gas emission point locations may cross at the target monitoring point location, which needs comprehensive analysis and evaluation of the data from multiple exhaust gas emission point location locations through the pollution analysis model to obtain the environmental pollution values of the exhaust gas emission point locations. In some embodiments of the present disclosure, the accuracy of the determined environmental pollution value may be further improved by determining the environmental pollution value by the pollution analysis graph structure and the pollution analysis model.

In 520, determining the device maintenance parameter based on the device operating state.

More descriptions regarding the device maintenance parameter may be found in FIG. 2 and its related descriptions, which may not be repeated here.

In some embodiments, the gas company management platform may determine a device abnormality type based on a change rate in the device operating state and/or the exhaust gas treatment device over multiple consecutive time periods, and determine a maintenance process based on the device abnormality type.

The change rate in the device operating state may reflect how the device operating state has changed. For example, the change rate in the device operating state may be determined by the device operating state during a historical time period.

The device abnormality type may include normal wear and tear, device failure, or the like. In some embodiments, in response to the device operating state change rate being relatively small and remaining stable (the device operating state is essentially unchanged), the device abnormality type may be determined to be normal wear and tear; if the device operating state change rate is relatively large and fluctuates (the device operating state changes significantly), the device abnormality type may be a device malfunction, which may be caused by the device abnormality leading to a sudden change in the device operating state.

In some embodiments, the gas company management platform may determine the maintenance process corresponding to a current device abnormality type based on the correspondence between the device abnormality type and the maintenance process. For example, the correspondence between the device abnormality type and the maintenance process includes: if the type of device abnormality is normal wear and tear, the maintenance process may include pipeline cleaning, replacement of consumables, or the like; if the type of device abnormality is device failure, the maintenance process may include device repair, device upgrade, or the like.

In embodiments of the present disclosure, determining the device maintenance parameter by assessing the device operating state can accurately remind gas companies to upgrade and modify tail gas treatment facilities to meet the need for effective reduction of environmental pollution.

In some embodiments, the device maintenance parameter may also include the updating reminder information. The updating reminder information is a message used to inform the target enterprise user whether the gas device needs to be updated. If the wear and tear of the device is too severe or it has become too outdated to meet the needs, it may no longer be maintained and may simply be replaced.

In some embodiments, the gas company management platform may predict, based on the gas regulatory data, an exhaust gas treatment intensity of the at least one target enterprise user; determine a reliability of continuing to use the exhaust gas treatment device in a future time period based on the exhaust gas treatment intensity; and in response to the reliability being less than a reliability threshold, send the updating reminder information to the at least one target enterprise user and the government gas management platform.

The exhaust gas treatment intensity refers to a load intensity of the exhaust gas treatment device. In some embodiments, the gas company management platform may calculate, based on the gas regulatory data, the exhaust gas emissions per unit of time during the gas usage period; and determine the exhaust gas treatment intensity based on the exhaust gas emissions per unit of time and an usage duration of the exhaust gas treatment device. The exhaust gas treatment intensity may be a weighted average of the exhaust gas emissions per unit of time for multiple gas use periods, a longer gas usage duration receiving a higher weight.

The reliability is a reliability degree of the gas device and the exhaust gas treatment device for normal use in a future period. In some embodiments, the higher the exhaust gas treatment intensity and the heavier the load on the exhaust gas treatment device, the lower the reliability for continued use in the future period.

In embodiments of the present disclosure, the accuracy of determining whether the device needs to be updated by assessing the reliability enables an accurate determination of whether the device can meet the demand for use.

In some embodiments, the gas company management platform may obtain a historical maintenance record of the at least one target enterprise user and historical gas usage data corresponding to the historical maintenance record; determine a performance decay rate of an exhaust gas treatment device of the at least one target enterprise user based on the historical maintenance record and the corresponding historical gas usage data; and determine the reliability based on the performance decay rate and the exhaust gas treatment intensity.

The historical maintenance record is a maintenance time, an actual maintenance result, and a maintenance process in the historical record. The rate of performance decay is a rate at which the performance of an exhaust gas treatment device in treating exhaust gases decreases.

In some embodiments of the present disclosure, the gas company management platform may evaluate and reset a performance value of the exhaust gas treatment device before and after the maintenance based on the actual maintenance result and the maintenance process each time; and determine a performance decay rate of the exhaust gas treatment device based on a plurality of reset performance values and the time intervals between two adjacent reset operations. The performance value is a numerical value that reflects the performance of the device. For example, the gas company management platform may obtain the performance decay rate by subtracting the performance value assessed after N maintenance visits from the performance value assessed during N+1 maintenance visits and dividing it by the time interval between two maintenance visits.

In some embodiments of the present disclosure, the gas company management platform may determine a future point in time at which the exhaust gas treatment device declines to a performance alert value based on the exhaust gas treatment intensity and the rate of performance decay. The reliability is relatively high if the future point is after the future time period, and the more the future point in time beyond the period after that future time period; conversely, the reliability is lower.

The performance alert value is a threshold used to determine the reliability. The performance alert value may be preset. The future time period is set according to the production situation of the target enterprise, such as the next week, the next month, or it may be the current time to the end of the target enterprise's current production peak period.

In embodiments of the present disclosure, determining the reliability by the rate of performance decay can further improve the accuracy of determining whether an updated device is needed.

In some embodiments, the reliability is further correlated to a historical exhaust gas treatment demand of the at least one target enterprise user. The greater the historical exhaust gas treatment demand, the higher the demand for the use of exhaust gas treatment device in the future period, which in turn increases the operational burden and rate of wear and the tear of the exhaust gas treatment device, resulting in the relatively low reliability.

In some embodiments, the gas company management platform may increase the exhaust gas treatment intensity based on the historical exhaust gas treatment demand. For example, the gas company management platform may increase the treatment intensity when the historical exhaust gas treatment demand is greater than the demand threshold. The higher the historical exhaust gas treatment demand, the greater the corresponding increase in the exhaust gas treatment intensity.

In embodiments of the present disclosure, determining the reliability through the historical exhaust gas treatment demands can further improve the accuracy of determining whether the updated device is needed.

One or more embodiments of the present disclosure provide an environmental monitoring system based on an intelligent gas regulatory IOTs, the system comprises a storage device and a processor, the storage device storing computer instructions; the processor being coupled to the storage device; and the processor causing the system to execute when executing the computer instructions. An environmental monitoring system based on the intelligent gas regulatory IoT may be part of the intelligent gas IOTs system.

One or more embodiments of the present disclosure provide a computer-readable storage medium, the storage medium storing computer instructions, and when the computer reads the computer instructions in the storage medium, the computer executes an environmental protection monitoring method for the environmental monitoring based on intelligent gas regulatory Internet of Things (IOTs) as described in any of the above embodiments.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Similar modifications, improvements, and corrections are suggested in the present disclosure, so similar modifications, improvements, and corrections are still within the spirit and scope of some embodiments of the present disclosure.

Also, the present disclosure uses specific words to describe embodiments of the present disclosure, such as "an embodiment," "one embodiment," and/or "some embodiments" means a feature, structure, or characteristic associated with at least one embodiment of the present disclosure. Accordingly, it should be emphasized and noted that "an embodiment", "one embodiment", or "an alternative embodiment" referred to two or more times at different locations in the present disclosure do not necessarily refer to the same embodiment. In addition, certain features, structures, or characteristics in one or more embodiments of the present disclosure may be suitably combined.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. Correspondingly, the embodiments of the present disclosure are not limited to the embodiments expressly presented and described herein.

What is claimed is:

1. A method for environmental monitoring based on intelligent gas regulatory Internet of Things (IOTs), the method being executed by a gas company management platform of an intelligent gas IOTs system, wherein the system comprises a government supervision and management platform, a government supervision sensor network platform, a government supervision object platform, a gas company sensing network platform, a gas device object platform, a gas user platform, and a gas service platform, and the government supervision object platform includes the gas company management platform;

the method comprising:

obtaining gas regulatory data of at least one enterprise user based on the gas device object platform, and storing the gas regulatory data categorized by the at least one enterprise user in an environmental protection data center; wherein the gas regulatory data includes at least one of gas usage data, exhaust gas emission, and exhaust gas treatment device operation data, the gas device object platform is configured to interact with a plurality of gas devices and the gas company sensing network platform, the plurality of gas devices include at least one of a gas meter, a gas monitoring device, an environmental protection facility, and a maintenance device, the environmental protection data center is set up in the gas company management platform, and the gas device object platform sends the gas regulatory data to the gas company management platform through the gas company sensing network platform;

determining, based on the gas regulatory data, at least one target enterprise user and at least one target monitoring point location and target monitoring parameter corresponding to the at least one target enterprise user, including:

for each of the at least one enterprise user, determining, based on the gas regulatory data corresponding to the enterprise user, a matching degree between the gas usage data and the exhaust gas emission with the exhaust gas treatment device operation data;

determining the at least one target enterprise user based on the matching degree; and determining the at least one target monitoring point location and the target monitoring parameter corresponding to the at least one target enterprise user based on gas regulatory data of the at least one target enterprise user, including:

determining an environmentally sensitive region based on environmental information of the at least one target enterprise user;

determining, based on the environmentally sensitive region, at least one set of candidate monitoring point locations and corresponding candidate monitoring parameters;

assessing a data adequacy degree of environmental monitoring data under the at least one set of candidate monitoring point locations and the corresponding candidate monitoring parameters based on a data assessment model, wherein the data assessment model is a machine learning model, and the data assessment model includes a feature extraction layer and a data evaluation layer, wherein inputs of the feature extraction layer include the at least one set of candidate monitoring point locations and the corresponding candidate monitoring parameters, and an output of the feature extraction layer includes a monitoring feature, inputs of the data evaluation layer include the monitoring feature and the gas regulatory data, and an output of the data evaluation layer includes the data adequacy degree;

the feature extraction layer and the data evaluation layer of the data assessment model are acquired by a joint training based on a first training sample and a first training label, the first training sample includes an actual monitoring point location and a monitoring parameter in the historical data, and the first training label is an adequacy of historical monitoring data obtained based on the first training sample; and a process of the joint training includes:

inputting the first training sample into an initial feature extraction layer, and obtaining a sample monitoring feature outputted by the initial feature extraction layer;

inputting the sample monitoring feature and sample gas regulatory data into an initial data evaluation layer, and obtaining a sample data adequacy degree outputted by the initial data evaluation layer;

constructing a loss function based on the sample monitoring feature output from the initial feature extraction layer and the first training label, synchronously updating parameters of the initial feature extraction layer and the initial data evaluation layer; and obtaining the feature extraction layer and the data evaluation layer by parameter updating; and determining the at least one target monitoring point locations and the target monitoring parameter based on the data adequacy degree;

sending the at least one target monitoring point location and the target monitoring parameter to a government gas management platform, determining, through the government gas management platform, a government environmental sampling parameter based on government environmental monitoring information, the at least one target monitoring point location, and the target monitoring parameter, sampling based on the government environmental sampling parameter to obtain surrounding environmental data, and sending the surrounding environmental data to the gas company management platform;

controlling an environmental monitoring device to monitor the at least one target monitoring point location according to the target monitoring parameter to determine target monitoring data, wherein the environmental monitoring device includes at least one of a fixed monitoring device and a mobile monitoring device;

determining, based on the target monitoring data and the surrounding environmental data, a device maintenance parameter for the at least one target enterprise user, wherein the device maintenance parameter includes a maintenance process and a maintenance time, wherein the maintenance process includes at least one of device cleaning, consumable replacement, device overhaul, and device upgrading;

generating, based on a device operating state and the maintenance parameter, at least one maintenance instruction, and sending, through the gas user platform, the at least one maintenance instruction to the corresponding target enterprise user respectively, including: in response to a determination that the device operating state is poor, generating the maintenance instruction based on the device maintenance parameter;

in response to receiving confirmation feedback from the at least one target enterprise user of the maintenance instruction, controlling the maintenance device to execute the maintenance instruction based on the gas company sensing network platform, wherein the maintenance device includes a cleaning device and an overhauling device;

obtaining an execution result of the at least one maintenance instruction, adjusting, based on the execution result, a collection frequency of the gas device object platform for obtaining the gas regulatory data, and adjusting at least one of a storage space allocation parameter and a data cleaning parameter of the environmental protection data center for the gas regulatory data of each of the at least one enterprise user, wherein the storage space allocation parameter is determined based on the collection frequency; and adjusting, based on the collection frequency and the storage space allocation parameter, a computing resource allocation parameter of the gas company management platform for supervision of each of the at least one enterprise user, wherein the higher the collection frequency and the larger the storage space allocation parameter, the larger the computing resource allocation parameter.

2. The method of claim 1, wherein the for each of the at least one enterprise user, determining, based on the gas regulatory data corresponding to the enterprise user, the matching degree between the gas usage data and the exhaust gas emission with the exhaust gas treatment device operation data further includes:

determining gas segmentation data and exhaust gas segmentation data for different continuous usage periods by dividing the gas usage data and the exhaust gas emission according to the continuous usage periods;

determining, based on the gas segmentation data and the exhaust gas segmentation data, whether there is an exhaust gas treatment demand for each of the continuous usage periods; and determining the matching degree based on the exhaust gas treatment demand and the exhaust gas treatment device operating data.

3. The method of claim 2, wherein the determining, based on the gas segmentation data and the exhaust gas segmentation data, whether there is the exhaust gas treatment demand for each of the continuous usage periods includes:

evaluating, based on the gas segmentation data and the exhaust gas segmentation data, a combustion adequacy degree for each of the continuous usage periods; and determining the exhaust gas treatment demand based on the combustion adequacy degree and the gas segmentation data for each of the continuous usage periods.

4. The method of claim 1, wherein the determining the at least one target enterprise user based on the matching degree includes:

designating at least one enterprise user with the matching degree below a first matching threshold or the matching degree above a second matching threshold as the at least one target enterprise user.

5. The method of claim 4, wherein the first matching threshold and the second matching threshold are adjusted based on a historical environmental pollution value of the at least one enterprise user.

6. The method of claim 1, wherein the device maintenance parameter includes a maintenance parameter of gas device and a maintenance parameter of exhaust gas treatment device; the determining, based on the target monitoring data and the surrounding environmental data, the device maintenance parameter for the at least one target enterprise user includes:

determining the device operating state based on the target monitoring data, the surrounding environmental data, and an enterprise gas layout graph of the at least one target enterprise user, wherein the device operating state includes an operating state of the gas device and/or an operating state of the exhaust gas treatment device; and determining the device maintenance parameter based on the device operating state.

7. The method of claim 6, wherein the determining the device operating state based on the target monitoring data, the surrounding environmental data, and the enterprise gas layout graph of the at least one target enterprise user includes:

determining an environmental pollution value of at least one exhaust gas emission point location based on the enterprise gas layout graph of the at least one target enterprise user and the target monitoring data; and determining the device operating state corresponding to the at least one exhaust gas emission point location based on the environmental pollution value of the at least one exhaust gas emission point location.

8. The method of claim 7, wherein the determining the environmental pollution value of at least one exhaust gas emission point location based on the enterprise gas layout graph of the at least one target enterprise user and the target monitoring data includes:

constructing a pollution analysis graph structure based on the at least one target monitoring point location, the exhaust gas emission point location, the target monitoring data, and the surrounding environmental data; and inputting the pollution analysis graph structure into a pollution analysis model to determine the environmental pollution value, the pollution analysis model being a machine learning model.

9. The method of claim 8, wherein the pollution analysis model is obtained based on training data training, determining the training data for training the pollution analysis model includes:
  setting multiple sets of sample target monitoring point locations and corresponding sample target monitoring parameters for sample enterprises;
  monitoring a data adequacy degree of the target monitoring data under each of multiple sets of sample target monitoring point locations and the corresponding sample target monitoring parameters by a data assessment model; and
  selecting a set of the sample target monitoring point locations and the corresponding sample target monitoring parameters for which the data adequacy degree meets a sufficiency requirement to construct a sample contamination analysis map as a training sample, and determining a corresponding pollution value as a training label.

10. The method of claim 6, wherein the device maintenance parameter further comprises updating reminder information, the determining the device maintenance parameter based on the device operating state further includes:
  predicting, based on the gas regulatory data, an exhaust gas treatment intensity of the at least one target enterprise user;
  determining a reliability of continuing to use the exhaust gas treatment device in a future time period based on the exhaust gas treatment intensity; and
  in response to the reliability being less than a reliability threshold, sending the updating reminder information to the at least one target enterprise user and the government gas management platform.

11. The method of claim 10, wherein the determining the reliability of continuing to use the exhaust gas treatment device in the future time period based on the exhaust gas treatment intensity includes:
  obtaining a historical maintenance record of the at least one target enterprise user and historical gas usage data corresponding to the historical maintenance record;
  determining a performance decay rate of an exhaust gas treatment device of the at least one target enterprise user based on the historical maintenance record and the corresponding historical gas usage data; and
  determining the reliability based on the performance decay rate and the exhaust gas treatment intensity.

12. The method of claim 11, wherein the reliability is further correlated to a historical exhaust gas treatment demand of the at least one target enterprise user.

13. The method of claim 1, wherein the method further comprises:
  determining a degree of sub-matching between gas segmentation data and exhaust gas segmentation data with the exhaust gas treatment device operating data during multiple continuous usage periods;
  determining an environmental value for the at least one enterprise user based on a degree of sub-matching corresponding to the multiple continuous usage periods; and
  adjusting the at least one target enterprise user based on the environmental value.

14. The method of claim 13, wherein the determining the environmental value for the at least one enterprise user based on the degree of sub-matching corresponding to the multiple continuous usage periods, includes:
  determining the environmental value by a weighted summation based on the degree of sub-matching for the multiple continuous usage periods, wherein a weight of the weighted summation is determined based on the gas segmentation data during the multiple continuous usage periods.

15. A system of environmental monitoring based on intelligent gas regulatory Internet of Things (IOTs), wherein the system comprises a government supervision and management platform, a government supervision sensor network platform, a government supervision object platform, a gas company sensing network platform, a gas device object platform, a gas user platform, a gas service platform, a storage device, and a processor, the government supervision object platform includes a gas company management platform, the storage device stores computer instructions, the processor is connected to the storage device, and the processor causes the system to perform following operations including:
  obtaining gas regulatory data of at least one enterprise user based on the gas device object platform, and storing the gas regulatory data categorized by the at least one enterprise user in an environmental protection data center; wherein the gas regulatory data includes at least one of gas usage data, exhaust gas emission, and exhaust gas treatment device operation data, the gas device object platform is configured to interact with a plurality of gas devices and the gas company sensing network platform, the plurality of gas devices include at least one of a gas meter, a gas monitoring device, an environmental protection facility, and a maintenance device, the environmental protection data center is set up in the gas company management platform, and the gas device object platform sends the gas regulatory data to the gas company management platform through the gas company sensing network platform;
  determining, based on the gas regulatory data, at least one target enterprise user and at least one target monitoring point location and target monitoring parameter corresponding to the at least one target enterprise user, including:
    for each of the at least one enterprise user, determining, based on the gas regulatory data corresponding to the enterprise user, a matching degree between the gas usage data and the exhaust gas emission with the exhaust gas treatment device operation data;
    determining the at least one target enterprise user based on the matching degree; and
    determining the at least one target monitoring point location and the target monitoring parameter corresponding to the at least one target enterprise user based on gas regulatory data of the at least one target enterprise user, including:
      determining an environmentally sensitive region based on environmental information of the at least one target enterprise user;
      determining, based on the environmentally sensitive region, at least one set of candidate monitoring point locations and corresponding candidate monitoring parameters;
      assessing a data adequacy degree of environmental monitoring data under the at least one set of candidate monitoring point locations and the corresponding candidate monitoring parameters based on a data assessment model, wherein the data assessment model is a machine learning model, and the data assessment model includes a feature extraction layer and a data evaluation layer, wherein inputs of the feature extraction layer include the at least one set of candidate monitoring point locations and the corresponding candidate monitoring parameters, and an output of the feature extraction layer includes a monitoring feature, inputs of the data evaluation layer include the monitoring feature and the gas regulatory data, and an output of the data evaluation layer includes the data adequacy degree;

the feature extraction layer and the data evaluation layer of the data assessment model are acquired by a joint training based on a first training sample and a first training label, the first training sample includes an actual monitoring point location and a monitoring parameter in the historical data, and the first training label is an adequacy of historical monitoring data obtained based on the first training sample; and a process of the joint training includes:
inputting the first training sample into an initial feature extraction layer, and obtaining a sample monitoring feature outputted by the initial feature extraction layer:

inputting the sample monitoring feature and sample gas regulatory data into an initial data evaluation layer, and obtaining a sample data adequacy degree outputted by the initial data evaluation layer;

constructing a loss function based on the sample monitoring feature output from the initial feature extraction layer and the first training label, synchronously updating parameters of the initial feature extraction layer and the initial data evaluation layer; and obtaining the feature extraction layer and the data evaluation layer by parameter updating; and determining the at least one target monitoring point locations and the target monitoring parameter based on the data adequacy degree;

sending the at least one target monitoring point location and the target monitoring parameter to a government gas management platform, determining, through the government gas management platform, a government environmental sampling parameter based on government environmental monitoring information, the at least one target monitoring point location, and the target monitoring parameter, sampling based on the government environmental sampling parameter to obtain surrounding environmental data, and sending the surrounding environmental data to the gas company management platform;

controlling an environmental monitoring device to monitor the at least one target monitoring point location according to the target monitoring parameter to determine target monitoring data, wherein the environmental monitoring device includes at least one of a fixed monitoring device and a mobile monitoring device;

determining, based on the target monitoring data and the surrounding environmental data, a device maintenance parameter for the at least one target enterprise user, wherein the device maintenance parameter includes a maintenance process and a maintenance time, wherein the maintenance process includes at least one of device cleaning, consumable replacement, device overhaul, and device upgrading;

generating, based on a device operating state and the maintenance parameter, at least one maintenance instruction, and sending, through the gas user platform, the at least one maintenance instruction to the corresponding target enterprise user respectively, including:
in response to a determination that the device operating state is poor generating the maintenance instruction based on the device maintenance parameter;

in response to receiving confirmation feedback from the at least one target enterprise user of the maintenance instruction, controlling the maintenance device to execute the maintenance instruction based on the gas company sensing network platform, wherein the maintenance device includes a cleaning device and an overhauling device;

obtaining an execution result of the at least one maintenance instruction, adjusting, based on the execution result, a collection frequency of the gas device object platform for obtaining the gas regulatory data, and adjusting at least one of a storage space allocation parameter and a data cleaning parameter of the environmental protection data center for the gas regulatory data of each of the at least one enterprise user, wherein the storage space allocation parameter is determined based on the collection frequency; and adjusting, based on the collection frequency and the storage space allocation parameter, a computing resource allocation parameter of the gas company management platform for supervision of each of the at least one enterprise user, wherein the higher the collection frequency and the larger the storage space allocation parameter, the larger the computing resource allocation parameter.

16. The system of claim 15, wherein the device maintenance parameter includes maintenance parameter of gas device and maintenance parameter of exhaust gas treatment device; to determine the device maintenance parameter of at least one target enterprise user based on the target monitoring data, the surrounding environmental data, the processor causes the system to perform following operations including:

determining the device operating state based on the target monitoring data, the surrounding environmental data, and an enterprise gas layout graph of the at least one target enterprise user, wherein the device operating state includes an operating state of the gas device and/or an operating state of the exhaust gas treatment device; and determining the device maintenance parameter based on the device operating state.

17. A non-transitory computer-readable storage medium, wherein the storage medium stores computer instructions to realize the method for environmental monitoring based on intelligent gas regulatory Internet of Things (IOTs) according to claim 1.

* * * * *